United States Patent
Xin

(10) Patent No.: US 11,088,883 B2
(45) Date of Patent: Aug. 10, 2021

(54) MULTICARRIER SYSTEM AND DATA MODULATION AND DEMODULATION METHOD AND DEVICE FOR MULTICARRIER SYSTEM

(71) Applicant: ZTE CORPORATION, Shenzhen (CN)

(72) Inventor: Yu Xin, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 43 days.

(21) Appl. No.: 16/314,989

(22) PCT Filed: Jul. 17, 2017

(86) PCT No.: PCT/CN2017/093227
§ 371 (c)(1),
(2) Date: Jan. 3, 2019

(87) PCT Pub. No.: WO2018/014815
PCT Pub. Date: Jan. 25, 2018

(65) Prior Publication Data
US 2019/0312764 A1    Oct. 10, 2019

(30) Foreign Application Priority Data
Jul. 22, 2016 (CN) .......................... 201610592069.7

(51) Int. Cl.
H04L 27/26 (2006.01)
(52) U.S. Cl.
CPC ...... *H04L 27/2607* (2013.01); *H04L 27/2602* (2013.01); *H04L 27/264* (2013.01); *H04L 27/2628* (2013.01); *H04L 27/2649* (2013.01)

(58) Field of Classification Search
CPC ............. H04L 27/2607; H04L 27/2602; H04L 27/2628; H04L 27/264; H04L 27/2649
See application file for complete search history.

(56) References Cited

U.S. PATENT DOCUMENTS

| 2013/0077466 A1* | 3/2013 | Takaoka .............. H04L 27/2628 370/210 |
| 2016/0212004 A1* | 7/2016 | Yun ...................... H04L 27/2627 |
| 2017/0310505 A1* | 10/2017 | Nadal ................. H04L 27/2698 |

FOREIGN PATENT DOCUMENTS

| CN | 101321146 A | 12/2008 |
| CN | 101867547 A | 10/2010 |

(Continued)

OTHER PUBLICATIONS

European Search Report for corresponding application EP17830449 filed Jun. 24, 2019.

(Continued)

*Primary Examiner* — Eric Myers
(74) *Attorney, Agent, or Firm* — Cantor Colburn LLP

(57) ABSTRACT

A multicarrier system and data modulation and demodulation methods and devices for the multicarrier system are provided. The data modulation method includes: performing cyclic shifting on data sequences of L continuous symbols respectively, L≥2; and modulating the cyclically shifted data sequences by use of a waveform function, an independent variable range of the waveform function being greater than or equal to a symbol interval of the L modulated symbols. The technical solution solves the technical problems in which the related art is not compatible with a LTE system or effectively suppressing out-of-band leakage or flexibly adjusting a symbol interval to adapt to different channel environments and exhibits poor demodulation performance, thus achieving effective suppression of the out-of-band leakage, having higher compatibility with the LTE system (Continued)

Performing cyclic shifting on data sequences of L continuous symbols respectively, L≥2 — S202

Modulating the cyclically shifted time-domain data sequences by use of a waveform function, an independent variable range of the waveform function being greater than or equal to a symbol interval of the L modulated symbols — S204 and improving demodulation performance and flexibility of adjusting a symbol interval by simple cyclic shifting.

22 Claims, 4 Drawing Sheets

(56) References Cited

FOREIGN PATENT DOCUMENTS

| CN | 102098262 A | 6/2011 |
|----|-------------|--------|
| CN | 103441734 A | 12/2013 |
| EP | 1469649 A1 | 10/2004 |
| WO | 2014175711 A1 | 10/2014 |

OTHER PUBLICATIONS

International Search Report for corresponding application PCT/CN2017/093227; Report dated Sep. 28, 2017.
Wanchun Zhang, "FB-OFDM: A Novel Multicarrier Scheme for 5G", ZTE Technology Journal, vol. 22, No. 3, Jun. 30, 2016, pp. 1-4.
Xin Yu, "FB-OFDM: A Novel Multicarrier Scheme for 5G", European Conference on Networks and Communication, vol. 22, No. 3. Jun. 30, 2016, pp. 1-4.
Chinese Office Action for corresponding application 201610592069.7 filed Jul. 22, 2016; Dated Apr. 30, 2021.
Chinese Search Report for corresponding application 201610592069.7 filed Jul. 22, 2016; Dated Apr. 26, 2021.

* cited by examiner

MULTICARRIER SYSTEM AND DATA MODULATION AND DEMODULATION METHOD AND DEVICE FOR MULTICARRIER SYSTEM

TECHNICAL FIELD

The disclosure relates to the field of communication, and particularly to a multicarrier system and data modulation and demodulation methods and devices for the multicarrier system.

BACKGROUND

A Long Term Evolution (LTE) technology is a 4th-Generation (4G) radio cellular communication technology. LTE adopts an Orthogonal Frequency Division multiplexing (OFDM) technology and time-frequency resources formed by subcarriers and OFDM symbols form radio physical time-frequency resources of a multicarrier system. At present, the OFDM technology has been extensively applied to radio communication. With adoption of a Cyclic Prefix (CP), a CP-OFDM system may solve a multipath delay problem well and divide a frequency selective channel into a set of parallel flat channels, so that a channel estimation method is greatly simplified and relatively high channel estimation accuracy is achieved. However, since the CP-OFDM system has bigger spectrum leakage and is sensitive to a frequency offset and time offset between adjacent sub-bands, interference between the sub-bands may further be brought.

At present, suppression of out-of-band leakage becomes an important direction for researches on 5th-Generation (5G) technologies. Several new multicarrier solutions are proposed in a related art, specifically including Filter Bank Multicarrier (FBMC), Generalized Frequency Division Multiplexing (GFDM), Universal Filtered Multicarrier (UFMC), Filtered OFDM (F-OFDM) and the like. FBMC may restrain out-of-band leakage well but is incompatible with the LTE technology, and has a problem in channel estimation and in combination with a Multiple Input Multiple Output (MIMO) technology and the like. GFDM does not have an ideal suppression effect of out-of-band leakage but has a higher processing complexity which causes inflexible regulation of a symbol interval. UFMC and F-OFDM do not have ideal out-of-band leakage suppression effects either, and moreover, cannot improve performance under the condition of keeping out-of-band unchanged by adjusting a symbol interval.

Until now, there is yet no effective technical solution for effectively suppressing out-of-band leakage and flexibly adjusting a symbol interval to adapt to different channel environments under the condition that the related art is not compatible with an LTE system and has poor demodulation performance.

SUMMARY

Embodiments of the disclosure provide a multicarrier system and data modulation and demodulation methods and devices for the multicarrier system, so as at least to solve the problems that out-of-band leakage cannot be restrained effectively and a symbol interval cannot be flexibly adjusted to adapt to different channel environments under the condition that the related art cannot be compatible with an LTE system and has poor demodulation performance.

According to an embodiment of the disclosure, a data modulation method for a multicarrier system is provided, which may include that: cyclic shifting is performed on time-domain data sequences of L continuous symbols respectively, $L \geq 2$; and the cyclically shifted time-domain data sequences are modulated by use of a waveform function, an independent variable range of the waveform function being greater than or equal to a symbol interval of the L modulated symbols.

Optionally, the data sequences of the L continuous symbols may be time-domain data sequences obtained by performing Inverse Fast Fourier Transform (IFFT) on frequency-domain data of the L continuous symbols respectively.

Optionally, the length of the independent variable range of the waveform function may be $N \times T1$, N being a real number greater than or equal to 1 and T1 being the symbol interval of the L continuous modulated symbols.

Optionally, the method may further include that: a difference value between cyclic shifts of adjacent symbols in the L continuous symbols is determined according to a value of T1.

Optionally, the cyclic shifts of the adjacent symbols may meet one of the following formulae:

$\mod((\mod(Y(i+1), T0) - \mod(Y(i), T0) + T0), T0) = \mod(T1, T0)$; and $T0 - \mod((\mod(Y(i+1), T0) - \mod(Y(i), T0) + T0), T0) = \mod(T1, T0)$, where $Y(1), Y(2) \ldots Y(L)$ may be the cyclic shifts and may be real numbers, i may be an integer between $[1, L-1]$ and T0 may be a reciprocal of an interval between adjacent subcarriers of the frequency-domain data before execution of the IFFT.

Optionally, modulation may include Filter Bank (FB) modulation.

Optionally, the waveform function may include one of: a root raised cosine function, a raised cosine function, a piecewise function and a rectangular function.

Optionally, a maximum time span between independent variables corresponding to nonzero function values of the waveform function may be greater than or equal to 2T1, the maximum time span being a time span between the independent variables corresponding to two endpoints of the nonzero function values in the independent variable range.

Optionally, the maximum time span may be greater than or equal to 3T1.

Optionally, $T1 = aT0$, a being $[15/14, 2]$ or $[8/7, 2]$.

Optionally, the operation that the cyclically shifted data sequences of the L continuous symbols are modulated by use of the waveform function may include that: independent variable shifting is performed on the waveform function corresponding to the L continuous symbols respectively; and a grouped linear operation is performed on the waveform function having been subjected to the independent variable shifting and the cyclically shifted data sequences of the L continuous symbols.

Optionally, the independent variable shifting may be performed on the waveform function corresponding to the L continuous symbols in the following manner: $g(t-D(i))$, where $g(t)$ may be the waveform function, $D(i)$ may be an independent variable shift of the waveform function corresponding to an ith symbol, $D(i+1) - D(i) = T1$ and i may be an integer between $[1, L]$.

Optionally, the operation that the grouped linear operation is performed on the waveform function having been subjected to the independent variable shifting and the cyclically shifted data sequences of the L continuous symbols may include that: first M-fold sampling and grouping is performed on discrete data sequences of the L continuous symbols having been subjected to the cyclical shifting to obtain M sets of data sequences S(m), m=1, 2, ..., M and a length of each set of data sequence being L; second M-fold sampling and grouping is performed on a discrete function form of g(t−D(i)) corresponding to the ith symbol to obtain M sets of data sequences Yi(m), m=1, 2, ..., M, a length of each set of data sequence being G and G being greater than or equal to N; a linear operation is performed on S(m) and L Yi(m) to generate data sequences R(m), namely $$R(m) = S(m) \times \begin{bmatrix} Y1(m) \\ Y2(m) \\ \vdots \\ YL(m) \end{bmatrix},$$

m=1, 2, ..., M; and the M sets of data sequences R(m) may be arranged according to a predetermined rule to obtain the modulated data sequences of the L continuous symbols, M being the number of the time-domain data sequences within time T0 and T0 being the reciprocal of the interval between the adjacent subcarriers of the frequency-domain data before execution of the IFFT.

Optionally, sampling may be performed on a continuous function form of the waveform function to obtain the discrete function form of g(t−D(i)) corresponding to the ith symbol, a sampling interval being a time interval between adjacent discrete data in the time-domain data sequences of the L continuous symbols.

Optionally, the L continuous symbols may be symbols on one subframe or one resource block in the multicarrier system.

According to another embodiment of the disclosure, a data demodulation method for a multicarrier system is provided, which may include that: modulated data is received, the modulated data being data obtained by performing first cyclic shifting on data sequences of L continuous symbols respectively and modulating the data sequences having been subjected to the first cyclic shifting by use of a specified waveform function; and demodulation is performed on the data by use of the specified waveform function to obtain the data sequences of the L continuous symbols.

Optionally, the method may further include that: second cyclic shifting is performed on the data sequences of the L continuous symbols respectively; and original data of the modulated data is acquired according to the data sequences having been subjected to the second cyclic shifting.

Optionally, the method may further include that: a difference value between cyclic shifts of adjacent symbols in the L continuous symbols is determined according to a value of T1, T1 being a symbol interval of the L continuous modulated symbols.

Optionally, a cyclic shift of the second cyclic shifting and a cyclic shift of first cyclic shifting may be opposite in direction and the same in modulus value.

Optionally, after the operation that the second cyclic shifting is performed on the time-domain sequences of the L continuous symbols, the method may further include that: Fast Fourier Transform (FFT) and channel equalization and detection are performed on the data.

According to still another embodiment of the disclosure, a data modulation device for a multicarrier system is provided, which may include: a cyclic shifting module, configured to perform cyclic shifting on data sequences of L continuous symbols respectively, L≥2; and a modulation module, configured to modulate the cyclically shifted data sequences by use of a specified waveform function, an independent variable range of the waveform function being greater than or equal to a symbol interval of the L modulated symbols.

Optionally, the data sequences of the L continuous symbols may be time-domain data sequences obtained by performing IFFT on frequency-domain data of the L continuous symbols respectively.

Optionally, the independent variable range of the waveform function may be N×T1, N being a real number greater than or equal to 1 and T1 being the symbol interval of the L continuous modulated symbols.

Optionally, the cyclic shifting module may further be configured to determine a difference value between cyclic shifts of adjacent symbols in the L continuous symbols according to a value of T1.

Optionally, the cyclic shift of the adjacent symbols may meet one of the following formulae:
mod((mod(Y(i+1), T0)−mod(Y(i), T0)+T0), T0)=mod (T1, T0) and
T0−mod((mod(Y(i+1), T0)−mod(Y(i), T0)+T0), T0)=mod(T1, T0), where Y(1), Y(2) ... Y(L) may be the cyclic shifts and may be real numbers, i may be an integer between [1, L−1] and T0 may be a reciprocal of an interval between adjacent subcarriers of the frequency-domain data before execution of the IFFT.

Optionally, the modulation module may further be configured to perform independent variable shifting on the waveform function corresponding to the L continuous symbols and perform a grouped linear operation on the waveform function having been subjected to the independent variable shifting and the cyclically shifted data sequences of the L continuous symbols.

Optionally, the modulation module may further be configured to perform the independent variable shifting on the waveform function corresponding to the L continuous symbols in the following manner: g(t−D(i)), where g(t) may be the waveform function, D(i) may be an independent variable shift of the waveform function corresponding to an ith symbol, D(i+1)−D(i)=T1 and i may be an integer between [1, L].

Optionally, the modulation module may further be configured to: perform first M-fold sampling and grouping on the cyclically shifted discrete data sequences of the L continuous symbols to obtain M sets of data sequences S(m), m=1, 2, ..., M and a length of each set of data sequence being L; perform second M-fold sampling and grouping on a discrete function form of g(t−D(i)) corresponding to the ith symbol to obtain M sets of data sequences Yi(m), m=1, 2, . . ., M, a length of each set of data sequence being G and G being greater than or equal to N; perform a linear operation on S(m) and L Yi(m) to generate data sequences R(m), namely $$R(m) = S(m) \times \begin{bmatrix} Y1(m) \\ Y2(m) \\ \vdots \\ YL(m) \end{bmatrix},$$

m=1, 2, ..., M; and arrange the M sets of data sequences R(m) according to a predetermined rule to obtain the modulated data sequences of the L continuous symbols, M being the number of the time-domain data sequences within time T0 and T0 being the reciprocal of the interval between the adjacent subcarriers of the frequency-domain data before execution of the IFFT.

According to yet another embodiment of the disclosure, a data demodulation device for a multicarrier system is provided, which may include: a receiving module, configured to receive modulated data, the modulated data being data obtained by performing first cyclic shifting on data sequences of L continuous symbols respectively and modulating the data sequences having been subjected to the first cyclic shifting by use of a specified waveform function; and a demodulation module, configured to perform demodulation on the data by use of the specified waveform function to obtain the data sequences of the L continuous symbols.

Optionally, the device may further include: a cyclic shifting module, configured to perform second cyclic shifting on the data sequences of the L continuous symbols respectively; and an acquisition module, configured to acquire original data of the modulated data according to the data sequences having been subjected to the second cyclic shifting.

Optionally, the cyclic shifting module may further be configured to determine a difference value between cyclic shifts of adjacent symbols in the L continuous symbols according to a value of T1, T1 being a symbol interval of the L continuous modulated symbols.

Optionally, the device may further include a processing module, configured to perform FFT and channel equalization and detection on the data.

According to another embodiment of the disclosure, a multicarrier system is provided, which may include: a sending node and a receiving node. The sending node may be configured to perform cyclic shifting on data sequences of L continuous symbols respectively, L≥2, and modulate the cyclically shifted data sequences by use of a specified waveform function, an independent variable range of the waveform function being greater than or equal to a symbol interval of the L modulated symbols. The receiving node may be configured to receive modulated data, the modulated data being data obtained by performing first cyclic shifting on the data sequences of the L continuous symbols respectively and modulating the data sequences having been subjected to first cyclic shifting by use of the specified waveform function, perform demodulation on the data by use of the specified waveform function to obtain the data sequences of the L continuous symbols, perform second cyclic shifting on the data sequences of the L continuous symbols respectively and acquire original data of the modulated data according to the data sequences having been subjected to the second cyclic shifting.

According to another embodiment of the disclosure, a storage medium is also provided. The storage medium is configured to store a program code for executing the following operations including: performing cyclic shifting on data sequences of L continuous symbols respectively, L≥2; and modulating the cyclically shifted data sequences by use of a specified waveform function, an independent variable range of the waveform function being greater than or equal to a symbol interval of the L modulated symbols.

Optionally, the storage medium may be further configured to store a program code for executing the following operation of: determining a difference value between cyclic shifts of adjacent symbols in the L continuous symbols according to a value of T1.

Optionally, the storage medium may be further configured to store a program code for executing the following operation that: the cyclic shifts of the adjacent symbols meet one of the following formulae:

mod((mod(Y(i+1), T0)−mod(Y(i), T0)+T0), T0)=mod(T1, T0) and
T0−mod((mod(Y(i+1), T0)−mod(Y(i), T0)+T0), T0)=mod(T1, T0), where Y(1), Y(2) . . . Y(L) may be the cyclic shifts and may be real numbers, i may be an integer between [1, L−1] and T0 may be a reciprocal of an interval between adjacent subcarriers of the frequency-domain data before execution of IFFT.

Optionally, the storage medium may be further configured to store a program code for executing the following operations including: performing independent variable shifting on the waveform function corresponding to the L continuous symbols; and performing a grouped linear operation on the waveform function having been subjected to the independent variable shifting and on the cyclically shifted data sequences of the L continuous symbols.

Optionally, the storage medium may be further configured to store a program code for executing the following operation: performing independent variable shifting on the waveform function corresponding to the L continuous symbols in the following manner: g(t−D(i)), where g(t) may be the waveform function, D(i) may be an independent variable shift of the waveform function corresponding to an ith symbol, D(i+1)−D(i)=T1 and i may be an integer between [1, L].

Optionally, the storage medium may be further configured to store a program code for executing the following operations: performing first M-fold sampling and grouping on the cyclically shifted discrete data sequences of the L continuous symbols to obtain M sets of data sequences S(m), m=1, 2, . . . , M and a length of each set of data sequence being L; performing second M-fold sampling and grouping on a discrete function form of g(t−D(i)) corresponding to the ith symbol to obtain M sets of data sequences Yi(m), m=1, 2, . . . , M, a length of each set of data sequence being G and G being greater than or equal to N; performing a linear operation on S(m) and L Yi(m) to generate data sequences R(m), namely $$R(m) = S(m) \times \begin{bmatrix} Y1(m) \\ Y2(m) \\ \vdots \\ YL(m) \end{bmatrix},$$

m=1, 2, . . . , M; and arranging the M sets of data sequences R(m) according to a predetermined rule to obtain the modulated data sequences of the L continuous symbols, M being the number of the time-domain data sequences within time T0 and T0 being the reciprocal of the interval between the adjacent subcarriers of the frequency-domain data before execution of the IFFT.

According to another embodiment of the disclosure, a storage medium is also provided. The storage medium is configured to store a program code for executing the following operations: receiving modulated data, the modulated data being data obtained by performing first cyclic shifting on data sequences of L continuous symbols respectively and modulating the data sequences having been subjected to first cyclic shifting by use of a specified waveform function; and performing demodulation on the data by use of the specified waveform function to obtain the data sequences of the L continuous symbols.

Optionally, the storage medium may be further configured to store a program code for executing the following operations: performing second cyclic shifting on the data sequences of the L continuous symbols respectively; and acquiring original data of the modulated data according to the data sequences having been subjected to the second cyclic shifting.

Optionally, the storage medium may be further configured to store a program code for executing the following operation: performing FFT and channel equalization and detection on the data.

Through the embodiments of the disclosure, cyclic shifting is performed on the data sequences of the L continuous symbols respectively, L and the cyclically shifted data sequences are modulated by use of a specified waveform function, an independent variable range of the waveform function being greater than or equal to a symbol interval of the L modulated symbols, thereby solving the technical problems that out-of-band leakage cannot be effectively suppressed and a symbol interval cannot be flexibly adjusted to adapt to different channel environments under the situation that the related art is not compatible with an LTE system and has poor demodulation performance. Thus, the out-of-band leakage can be suppressed well, widths of main lobes of subcarriers on a frequency domain are decreased, overlapping of the main lobes of adjacent subcarriers is further avoided, interference between the adjacent subcarriers is cancelled, relatively high compatibility with the LTE system can be achieved and meanwhile, demodulation performance and symbol interval regulation flexibility are improved by simple cyclic shifting operations.

BRIEF DESCRIPTION OF DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

The disclosure will be described below with reference to the drawings and in combination with the embodiments in detail. It is to be noted that the embodiments in the application and characteristics in the embodiments may be combined without conflicts.

It is to be noted that terms "first", "second" and the like in the specification, claims and drawings of the disclosure are not to describe a specific sequence or order but to distinguish similar objects.

Embodiment 1

Figure 1:
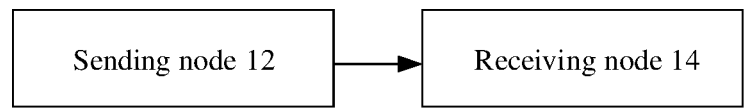
FIG. 1 is a diagram of a network architecture according to an embodiment of the disclosure.

FIG. 1 is a diagram of a network architecture according to an embodiment of the disclosure. The embodiment of the application may be run on the network architecture shown in FIG. 1. As shown in FIG. 1, the network architecture includes a sending node 12 and a receiving node 14. The sending node 12 sends cyclically shifted and modulated data to the receiving node 14 and the receiving node 14 demodulates the data, performs cyclic shifting again and acquires original data according to a cyclically shifted data sequence. The sending node 12 and the receiving node 14 may be devices such as base stations, terminals or relay equipment.

Figure 2:
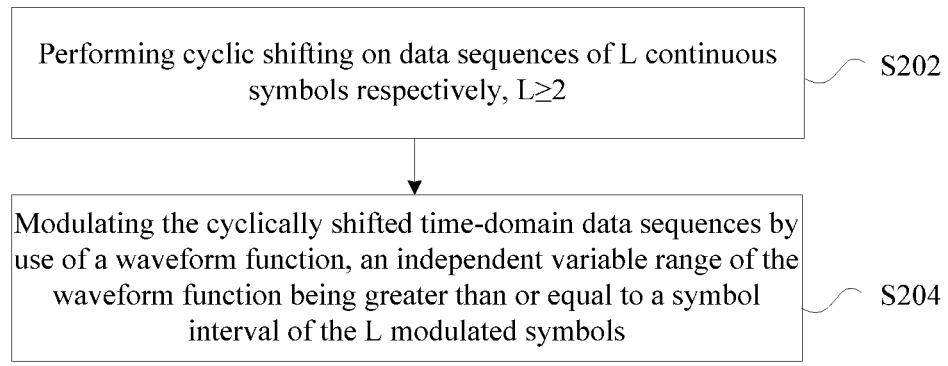
FIG. 2 is a flowchart of a data modulation method for a multicarrier system according to an embodiment of the disclosure.

The embodiment provides a data modulation method for a multicarrier system running on the network architecture shown in FIG. 1. FIG. 2 is a flowchart of a data modulation method for a multicarrier system according to an embodiment of the disclosure. As shown in FIG. 2, the flow includes the following operations.

In S202, cyclic shifting is performed on data sequences of L continuous symbols respectively, $L \geq 2$.

In S204, the cyclically shifted data sequences are modulated by use of a specified waveform function. An independent variable range of the waveform function is greater than or equal to a symbol interval of the L modulated symbols.

Through the above operations, cyclic shifting is performed on the data sequences of the L continuous symbols respectively, $L \geq 2$, and the cyclically shifted data sequences are modulated by use of the specified waveform function. The independent variable range of the waveform function is greater than or equal to the symbol interval of the L modulated symbols. Therefore, the technical problems of incapability of effectively suppressing out-of-band leakage or flexibly adjusting a symbol interval to adapt to different channel environments under the condition that the related art is incompatible with an LTE system and has poor demodulation performance are solved. Thus, the out-of-band leakage can be suppressed well, widths of main lobes of subcarriers on a frequency domain are decreased, overlapping of the main lobes of adjacent subcarriers is further avoided, interference of the adjacent subcarriers is cancelled, relatively high compatibility with the LTE system is achieved and, meanwhile, demodulation performance and symbol interval regulation flexibility are improved by simple cyclic shifting operations.

Optionally, an execution body of the operations may be, but not limited to, a base station, a terminal, relay equipment, a transmitting point and the like.

In an optional embodiment, the data sequences of the L continuous symbols are time-domain data sequences obtained by performing IFFT on frequency-domain data of the L continuous symbols respectively. In the embodiment, adopting IFFT may effectively convert the frequency-domain data into the time-domain data sequences. However, the disclosure is not limited thereto.

Optionally, T0 is a reciprocal of an interval between adjacent subcarriers of the frequency-domain data before execution of IFFT. For example, $T0=F$ under the condition that the interval between the adjacent subcarriers of the frequency-domain data is F and, when a bandwidth of an LTE system is 10 MHz, IFFT may be performed on the L continuous symbols respectively to obtain L time-domain data sequences Z(i), i being an integer between [1, L] and Z1(i) being an infinitely long data sequence taking T0 as a period. Then, T0=1024×Ts. Here, M is the number of the time-domain data sequences in time T0 and, specifically, M=1024. Ts is a time interval between adjacent data. In addition, for simplification, it may be set in LTE that a length of a time-domain data sequence obtained by IFFT processing over each symbol is T0.

Optionally, when it is set that the length of a time-domain data sequence obtained by IFFT processing over each symbol is T0, cyclic shifting is performed on data within T0. When it is set that the time-domain data sequence obtained by IFFT processing over each symbol is an infinitely long data sequence taking T0 as a period, direct data shifting is equivalent to cyclic shifting within each period T0. Cyclic shifting of the data within T0 is adopted but not intended to limit the embodiment of the disclosure.

In an optional embodiment, the length of the independent variable range of the waveform function is N×T1, where N is a real number greater than or equal to 1 and T1 is the symbol interval of the L continuous symbols after modulation. In the embodiment, optionally, N is a constant or a variable. When it is a constant, the independent variable range of the waveform function is positively proportional to the symbol interval of the L symbols after modulation. However, no matter whether N is a constant or a variable, the independent variable range of the waveform function is greater than or equal to the symbol interval of the L modulated symbols. Therefore, the out-of-band leakage is suppressed relatively well, the widths of the main lobes of the subcarriers on the frequency domain are decreased, overlapping of the main lobes of the adjacent subcarriers is further avoided and the interference between the adjacent subcarriers is canceled.

In an optional embodiment, a difference value of cyclic shifts of adjacent symbols in the L continuous symbols is determined according to a value of T1. In the embodiment, the shift may be represented with time, that is, the shift is equal to a product of the amount of shifted data multiplied with Ts. Cyclic shifting is performed on the time-domain data sequences Z1(i) having been subjected to IFFT to obtain data sequences Z2(i).

In an optional embodiment, the cyclic shifts of the adjacent symbols meet one of the following formulae: mod((mod(Y(i+1), T0)−mod(Y(i), T0)+T0), T0)=mod(T1, T0); and T0−mod((mod(Y(i+1), T0)−mod(Y(i), T0)+T0), T0)=mod(T1, T0), where Y(1), Y(2) . . . Y(L) are cyclic shifts and are real numbers and i is an integer between [1, L−1]. In the embodiment, cyclic shifting adopts, but not limited to, rightward cyclic shifting and may also adopt leftward cyclic shifting or a combination of the two. In the LTE system, there are 14 symbols in a 1 ms subframe and thus an average symbol interval is ¹⁄₁₄ ms. In the disclosure, the symbol interval is flexibly changed by different cyclic shifting operations. When T1=T0, the cyclic shift is 0, which is equivalent to that no cyclic shifting operation is required to be performed. When T1>T0, the symbol interval is larger than the reciprocal of the interval between the adjacent subcarriers. When T1<T0, the symbol interval is smaller than the reciprocal of the interval between the adjacent subcarriers. In case of a relatively poor channel condition, the symbol interval T1 may be increased, thereby achieving orthogonality of time/frequency-domain data better and improving the demodulation performance. In case of a relatively good channel condition, the symbol interval T1 may be reduced and even be reduced to be smaller than T0 to implement super-Nyquist transmission. Therefore, different cyclic shifting operations are performed for flexible adaptation to changes of different channel environments.

Optionally, the cyclic shift may also be represented with the amount of discrete data. Therefore, in the embodiment, Ts is a time interval between adjacent discrete data in the time-domain data sequence. If the amount of discrete data in time T0 is K0, K0×Ts=T0. If the amount of discrete data in time T1 is K1, K1×Ts=T1. Then, the cyclic shifts of the adjacent symbols meet one of the following formulae: mod((mod(Y(i+1), K0)−mod(Y(i), K0)+K0), K0)=mod(K1, K0) (cyclic shifting is rightward cyclic shifting); and K0−mod((mod(Y(i+1), K0)−mod(Y(i), K0)+K0), K0)=mod(K1, K0) (the cyclic shifting is leftward cyclic shifting), where Y(1), Y(2) . . . Y(L) are integers and i is an integer between [1, L−1].

It is to be noted that, when the time-domain sequence obtained by IFFT processing over each symbol is arranged according to a column vector and the data sequence is arranged from top to bottom, rightward cyclic shifting is equivalent to downward cyclic shifting. Similarly, leftward cyclic shifting is equivalent to upward cyclic shifting.

In an optional embodiment, modulation includes FB modulation. In the embodiment, FB modulation may be called multi-phase filter modulation, multiple filters may be processed in parallel and an FB modulation parameter may be determined according to a specified waveform function. Adopting FB modulation may effectively and accurately implement parallel modulation of the multiple filters.

In an optional embodiment, the waveform function includes one of: a root raised cosine function, a raised cosine function, a piecewise function and a rectangular function. In the embodiment, the raised cosine function may be a time-domain function obtained by IFFT over a frequency-domain raised cosine function and may also directly be a time-domain raised cosine function. The root raised cosine function may also be a time-domain function obtained by IFFT over a frequency-domain raised cosine function or is directly a time-domain function. The piecewise function refers to a function represented by combining nonzero function values with multiple mathematic expressions in different independent variable ranges, for example, a step function with multiple nonzero platform values. Adopting any one of the above functions as the waveform function may ensure no interference and orthogonality between the symbols.

Optionally, a time-domain length of the waveform function is extended by adding a value 0. For example, for a waveform function with a length N×T, a segment of independent variable range with a function value 0 may be added to one side of an independent variable range to change a total length of the independent variable range to be (N+1)×T.

In an optional embodiment, a maximum time span between independent variables corresponding to nonzero function values of the waveform function may be greater than or equal to 2T1, the maximum time span being a time span between the independent variables corresponding to two endpoints of the nonzero function values in the independent variable range.

In an optional embodiment, the maximum time span may also be greater than or equal to 3T1. When the maximum time span may also be greater than or equal to 3T1, the out-of-band leakage may be suppressed more effectively. In the embodiment, the waveform function may be bilaterally symmetric about a midpoint of the independent variable range of the function as an axis, that is, function values of an NT1/2 segment on the left and an NT1/2 segment on the right are bilaterally symmetric. Optionally, the specified waveform function may be a waveform function predetermined in a standard/protocol or a waveform function which is set for a sending node by a corresponding node. For example, when the sending node is User Equipment (UE), a base station sets the waveform function for the UE.

In an optional embodiment, T1=aT0 and the value range of a is [15/14, 2] or [8/7, 2], so that subcarriers may also be mutually orthogonal and free of interference in case of asynchronism.

In an optional embodiment, the operation that the cyclically shifted data sequences of the L continuous symbols are modulated by use of the waveform function may be implemented in the following manner: independent variable shifting is performed on the waveform function corresponding to the L continuous symbols respectively; and a grouped linear operation is performed on the waveform function having been subjected to independent variable shifting and on the cyclically shifted data sequences of the L continuous symbols. In the embodiment, the waveform function corresponding to the L continuous symbols may be the same function or may be multiple different functions. In such a modulation manner, the out-of-band leakage may be suppressed relatively well, the widths of the main lobes of the subcarriers on the frequency domain may be decreased, overlapping of the main lobes of the adjacent subcarriers is further avoided and the interference between the adjacent subcarriers is canceled.

In an optional embodiment, independent variable shifting is performed on the waveform function corresponding to the L continuous symbols in the following manner: g(t−D(i)), where g(t) is the waveform function, D(i) is an independent variable shift of the waveform function corresponding to an ith symbol, D(i+1)−D(i)=T1 and i is an integer between [1, L].

In an optional embodiment, the operation that the grouped linear operation is performed on the waveform function having been subjected to independent variable shifting and the cyclically shifted data sequences of the L continuous symbols may be implemented in the following manner: first M-fold sampling and grouping is performed on the cyclically shifted discrete data sequences of the L continuous symbols to obtain M sets of data sequences S(m), m=1, 2, . . . , M, and a length of each set of data sequence being L; second M-fold sampling and grouping is performed on a discrete function form of g(t−D(i)) corresponding to the ith symbol to obtain M sets of data sequences Yi(m), m=1, 2, . . . , M, a length of each set of data sequence being G and G being greater than or equal to N; a linear operation is performed on S(m) and L Yi(m) to generate data sequences R(m), namely $$R(m) = S(m) \times \begin{bmatrix} Y1(m) \\ Y2(m) \\ \vdots \\ YL(m) \end{bmatrix},$$

m=1, 2, . . . , M; and the M sets of data sequences R(m) are arranged according to a predetermined rule to obtain the modulated data sequences of the L continuous symbols. In the embodiment, the linear operation may be equivalent to filter processing. When T1=T0, the linear operation is equivalent to time-invariant filter processing or equivalent to a convolutional operation of a time-invariant response function. When T1≠T0, the linear operation is equivalent to time-varying filter processing or equivalent to a convolutional operation of a time-varying response function. Therefore, the linear operation over the M sets may be equivalent to FB processing.

In an optional embodiment, sampling is performed on a continuous function form of the waveform function to obtain the discrete function form of g(t−D(i)) corresponding to the ith symbol, a sampling interval being a time interval between adjacent discrete data in the time-domain data sequences of the L continuous symbols.

In the embodiment, when the waveform function is a continuous function, a discrete function value of the waveform function is obtained by sampling values of the continuous function, a sampling interval being equal to the time interval between the adjacent discrete data in the time-domain data sequence of each symbol. That is, the discrete value of the waveform function refers to a function value corresponding to an independent variable value at the same moment with time-domain data of each symbol. After the data sequence of each symbol is repeatedly extended into a data sequence with a length N×T1, the time interval between the adjacent discrete data in the data sequence is Ts and the amount of the discrete data in time T is K. Then, K×Ts=T and N×K×Ts=N×T. Therefore, a data sequence with a length N×K includes N×K pieces of discrete data, where N×K being an integer. In a case that a moment at which first discrete data is located is 0, then a moment at which second discrete data is located is Ts, a moment for the third discrete data is 2 Ts and a moment at which (N×K)th discrete data is located is (N×K−1)Ts. Since the length of the independent variable range of the waveform function is also N×K, the discrete value of the waveform function refers to a corresponding function value when the independent variable is 0, Ts, . . . , (N×K−1)Ts.

Optionally, when the waveform function is a discrete function, the number of discrete function values of the waveform function is the same as the amount of discrete data in the time-domain data sequence obtained by repeatedly extending the data sequence of each symbol and having the length N×T1. The discrete function may be obtained by sampling the continuous function.

In the embodiment, values of N and T1 may be predetermined in a standard/protocol or set by a corresponding node. When multiple values are predetermined for T1, the values may also be set by a corresponding node. For example, when the sending node is UE, a base station may set and transmit a value of T1 to the UE.

In an optional embodiment, the L continuous symbols are, but not limited to, symbols on a subframe or resource block in the multicarrier system. The L continuous symbols may also be symbols on another resource unit.

In the embodiment of the disclosure, after the time-domain data sequences of the L continuous symbols is acquired, no CP is added to the time-domain data sequences. Instead, cyclic shifting is performed and, after acquisition of the time-domain data sequences of the L continuous symbols and before modulation, another processing process may be added without adding a CP, so that the out-of-band leakage is suppressed relatively well, the widths of the main lobes of the subcarriers on the frequency domain are decreased, overlapping of the main lobes of the adjacent subcarriers is further avoided, the interference between the adjacent subcarriers is canceled, relatively high compatibility with the LTE system is achieved, and meanwhile, the demodulation performance and the symbol interval regulation flexibility are improved by simple cyclic shifting.

Figure 3:
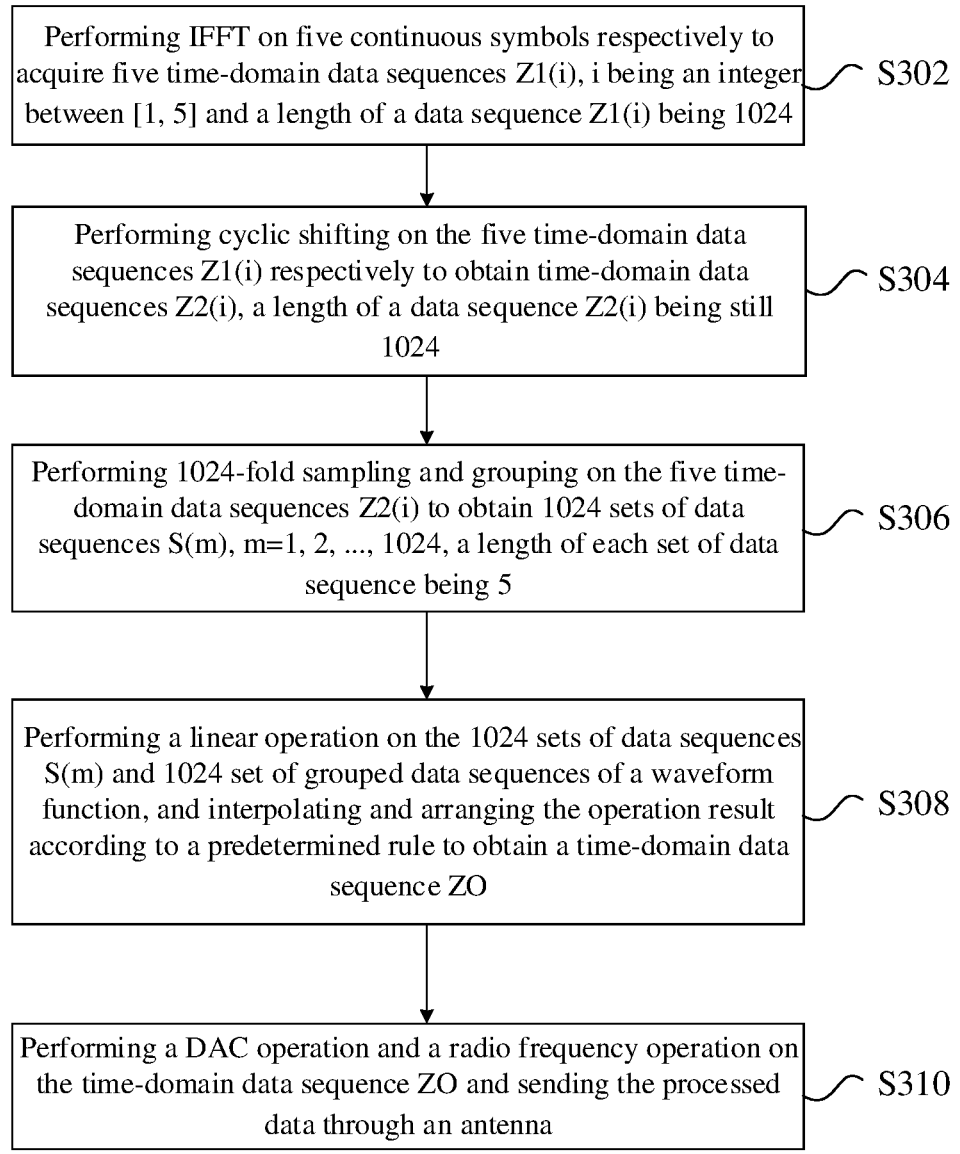
FIG. 3 is a flowchart of a data modulation method for a multicarrier system according to an optional embodiment of the disclosure.

In an optional embodiment, FIG. 3 is a flowchart of a data modulation method for a multicarrier system according to an optional embodiment of the disclosure. The method is applied to a sending node 12. As shown in FIG. 3, the flow includes the following operations.

In S302, IFFT is performed on five continuous symbols respectively to acquire five time-domain data sequences $Z1(i)$, i being an integer between [1, 5] and a length of each data sequence $Z1(i)$ being 1024.

In S304, cyclic shifting is performed on the five time-domain data sequences $Z1(i)$ respectively to obtain time-domain data sequences $Z2(i)$, a length of each data sequence $Z2(i)$ being still 1024.

In S306, 1024-fold sampling and grouping is performed on the five time-domain data sequences $Z2(i)$ to obtain 1024 sets of data sequences $S(m)$, $m=1, 2, \ldots, 1024$, a length of each set of data sequences being 5.

In S308, a linear operation is performed on the 1024 sets of data sequences $S(m)$ and 1024 sets of grouped data sequences of a waveform function, and the operation results are interpolated and arranged according to a predetermined rule to obtain a time-domain data sequence ZO.

In S310, a Digital-to-Analogue Converter (DAC) operation and a radio frequency operation are performed on the time-domain data sequence ZO and processed data is sent through an antenna.

The above operations solve the technical problems that the related art is incapable of effectively suppressing out-of-band leakage or flexibly adjusting a symbol interval to adapt to different channel environments under the condition that the related art is incompatible with an LTE system and has poor demodulation performance, thereby achieving the effects of suppressing the out-of-band leakage relatively well, decreasing widths of main lobes of subcarriers on a frequency domain, further avoiding overlapping of the main lobes of adjacent subcarriers, canceling interference of the adjacent subcarriers, achieving relatively high compatibility with the LTE system and meanwhile, improving demodulation performance and symbol interval regulation flexibility by simple cyclic shifting operations.

From the above descriptions about the implementation modes, those skilled in the art may clearly know that the method according to the abovementioned embodiments may be implemented by a combination of software and a universal hardware platform, and of course, may also be implemented through hardware, but the former is a preferred implementation mode under many circumstances. Based on such an understanding, the technical solutions of the disclosure substantially or the parts making contributions to the related art may be embodied by a software product. The computer software product is stored in a storage medium (for example, a Read-Only Memory (ROM)/Random Access Memory (RAM), a magnetic disk and an optical disk), including a plurality of instructions which are set to enable a computer device (which may be a personal computer, a server, a network device or the like) to execute the method in each embodiment of the disclosure.

Embodiment 2

Figure 4:
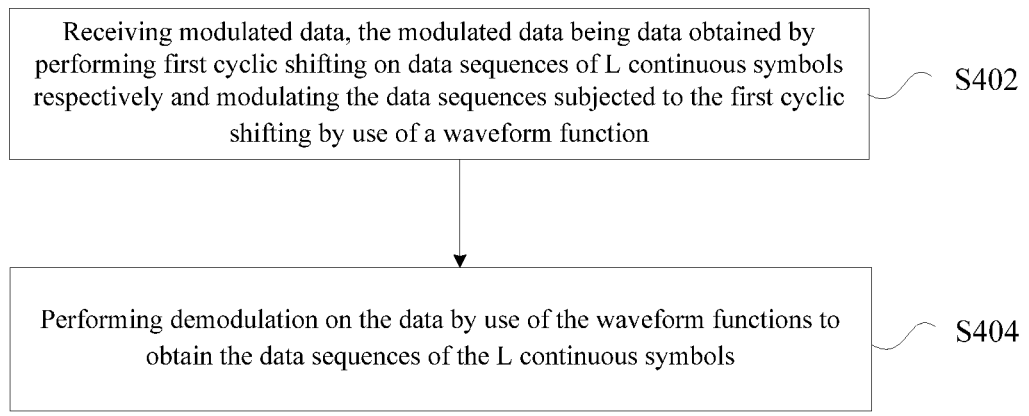
FIG. 4 is a flowchart of a data demodulation method for a multicarrier system according to an embodiment of the disclosure.

The embodiment provides a data demodulation method for a multicarrier system running on the network architecture shown in FIG. 1. FIG. 4 is a flowchart of a data demodulation method for a multicarrier system according to an embodiment of the disclosure. As shown in FIG. 4, the flow includes the following operations.

In S402, modulated data is received, the modulated data being data obtained by performing first cyclic shifting on data sequences of L continuous symbols respectively and modulating the data sequences having been subjected to the first cyclic shifting by use of a specified waveform function.

In S404, demodulation is performed on the data by use of the specified waveform function to obtain the data sequences of the L continuous symbols.

Through the operations, the modulated data is demodulated and the data sequences of the L continuous symbols are obtained, thereby solving the technical problems that the related art is incapable of effectively suppressing out-of-band leakage or flexibly adjusting a symbol interval to adapt to different channel environments under the condition that the related art is not compatible with an LTE system and has poor demodulation performance, and achieving the effects of suppressing the out-of-band leakage relatively well, decreasing widths of main lobes of subcarriers on a frequency domain, further avoiding overlapping of the main lobes of adjacent subcarriers, canceling interference of the adjacent subcarriers, achieving relatively high compatibility with the LTE system and, meanwhile, improving demodulation performance and symbol interval regulation flexibility by simple cyclic shifting operations.

In an optional embodiment, original data of the modulated data is acquired in the following manner: second cyclic shifting is performed on the data sequences of the L continuous symbols respectively; and the original data of the modulated data is acquired according to the data sequences having been subjected to the second cyclic shifting. In the embodiment, the original data is data before the received data is modulated.

In an optional embodiment, a difference value between cyclic shifts of adjacent symbols in the L continuous symbols is determined according to a value of T1, T1 being a symbol interval of the L continuous modulated symbols.

In an optional embodiment, a cyclic shift of the second cyclic shifting and a cyclic shift of the first cyclic shifting are, but not limited to be, opposite in direction and the same in modulus value. The cyclic shift of the second cyclic shifting and the cyclic shift of the first cyclic shifting may be the same in direction and/or different in modulus value.

In an optional embodiment, FFT and channel equalization and detection may be performed on the data after the second cyclic shifting.

From the above descriptions about the implementation modes, those skilled in the art may clearly know that the method according to the abovementioned embodiments may be implemented in a manner of combining software and a universal hardware platform, and of course, may also be implemented through hardware, but the former is a preferred implementation mode under many circumstances. Based on such an understanding, the technical solutions of the disclosure substantially or the parts making contributions to the related art may be embodied in form of a software product, and the computer software product is stored in a storage medium (for example, a ROM/RAM, a magnetic disk and an optical disk), including a plurality of instructions configured to enable a computer device (which may be a personal computer, a server, a network device or the like) to execute the method in each embodiment of the disclosure.

Embodiment 3

The embodiment also provides a data modulation device for a multicarrier system. The device is configured to implement the abovementioned embodiments and preferred implementation modes. What has been described will not be elaborated. For example, the term "module", used below, may be a combination of software and/or hardware capable of realizing a preset function. Although the device described in the following embodiment is preferably implemented with software, implementation with hardware or a combination of the software and the hardware is also possible and conceivable.

Figure 5:
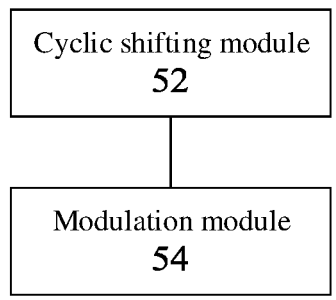
FIG. 5 is a structure block diagram of a data modulation device for a multicarrier system according to an embodiment of the disclosure.

FIG. 5 is a structure block diagram of a data modulation device for a multicarrier system according to an embodiment of the disclosure. As shown in FIG. 5, the device includes: a cyclic shifting module 52, configured to perform cyclic shifting on data sequences of L continuous symbols respectively, L≥2; and a modulation module 54, configured to modulate the cyclically shifted data sequences by use of a waveform function, an independent variable range of the waveform function being greater than or equal to a symbol interval of the L modulated symbols.

In an optional embodiment, the data sequences of the L continuous symbols are time-domain data sequences obtained by performing IFFT on frequency-domain data of the L continuous symbols respectively.

In an optional embodiment, the independent variable range of the waveform function is N×T1, N being a real number greater than or equal to 1 and T1 being the symbol interval of the L continuous modulated symbols.

In an optional embodiment, the cyclic shifting module 52 is further configured to determine a difference value between cyclic shifts of adjacent symbols in the L continuous symbols according to a value of T1.

In an optional embodiment, the cyclic shifts of the adjacent symbols meet one of the following formulae:

mod((mod(Y(i+1), T0)−mod(Y(i), T0)+T0), T0)=mod (T1, T0) and

T0−mod((mod(Y(i+1), T0)−mod(Y(i), T0)+T0), T0)=mod(T1, T0), where Y(1), Y(2) . . . Y(L) are cyclic shifts and are real numbers, i is an integer between [1, L−1] and T0 is a reciprocal of an interval between adjacent subcarriers of the frequency-domain data before execution of IFFT.

In an optional embodiment, the modulation module 54 is further configured to perform independent variable shifting on the waveform function corresponding to the L continuous symbols and perform a grouped linear operation on the waveform function having been subjected to the independent variable shifting and on the cyclically shifted data sequences of the L continuous symbols.

In an optional embodiment, the modulation module 54 is further configured to perform independent variable shifting on the waveform function corresponding to the L continuous symbols in the following manner: g(t−D(i)), where g(t) is the waveform function, D(i) is an independent variable shift of the waveform function corresponding to an ith symbol, D(i+1)−D(i)=T1 and i is an integer between [1, L].

In an optional embodiment, the modulation module 54 is further configured to: perform first M-fold sampling and grouping on the cyclically shifted discrete data sequences of the L continuous symbols to obtain M sets of data sequences S(m), m=1, 2, . . . , M, and a length of each set of data sequence being L; perform second M-fold sampling and grouping on a discrete function form of g(t−D(i)) corresponding to the ith symbol to obtain M sets of data sequences Yi(m), m=1, 2, . . . , M, a length of each set of data sequence being G and G being greater than or equal to N; perform a linear operation on S(m) and L Yi(m) to generate data sequences R(m), namely $$R(m) = S(m) \times \begin{bmatrix} Y1(m) \\ Y2(m) \\ \vdots \\ YL(m) \end{bmatrix},$$

m=1, 2, . . . , M; and arrange the M sets of data sequences R(m) according to a predetermined rule to obtain the modulated data sequences of the L continuous symbols, M being the number of the time-domain data sequences within time T0 and T0 being the reciprocal of the interval between the adjacent subcarriers of the frequency-domain data before execution of IFFT.

It is apparent that those skilled in the art should know that each module or each operation of the disclosure may be implemented by a universal computing device, and the modules or operations may be concentrated on a single computing device or distributed on a network formed by a plurality of computing devices, and may optionally be implemented by program codes executable for the computing devices, so that the modules or operations may be stored in a storage device for execution with the computing devices, the shown or described operations may be executed in sequences different from those described here in some circumstances, or may form each integrated circuit module respectively, or multiple modules or operations therein may form a single integrated circuit module for implementation. As a consequence, the disclosure is not limited to any specific combination of hardware and software.

Embodiment 4

The embodiment also provides a data demodulation device for a multicarrier system. The device is configured to implement the abovementioned embodiments and preferred implementation modes. What has been described will not be elaborated. For example, the term "module", used below, may be a combination of software and/or hardware capable of realizing a preset function. Although the device described in the following embodiment is preferably implemented with software, implementation with hardware or a combination of the software and the hardware is also possible and conceivable.

Figure 6:
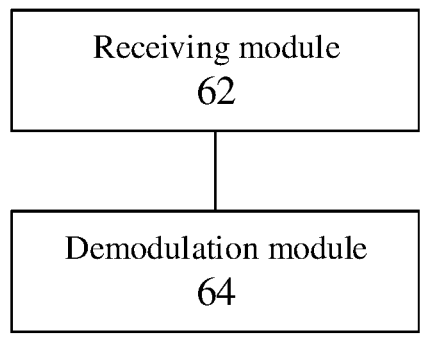
FIG. 6 is a structure block diagram of a data demodulation device for a multicarrier system according to an embodiment of the disclosure.

FIG. 6 is a structure block diagram of a data demodulation device for a multicarrier system according to an embodiment of the disclosure. As shown in FIG. 6, the device includes: a receiving module 62, configured to receive modulated data, the modulated data being data obtained by performing first cyclic shifting on data sequences of L continuous symbols respectively and modulating the data sequences having been subjected to the first cyclic shifting by use of a waveform function; and a demodulation module 64, configured to perform demodulation on the data by use of the waveform function to obtain the data sequences of the L continuous symbols.

Figure 7:
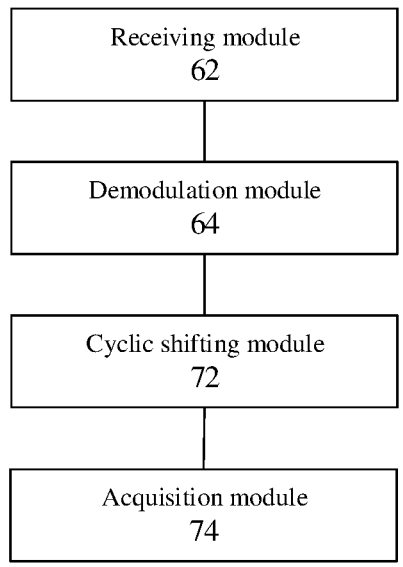
FIG. 7 is a first structure block diagram of a data demodulation device for a multicarrier system according to an optional embodiment of the disclosure.

In an optional embodiment, FIG. 7 is a first structure block diagram of a data demodulation device for a multicarrier system according to an optional embodiment of the disclosure. As shown in FIG. 7, the device includes all the modules shown in FIG. 6 and the device further includes: a cyclic shifting module 72, configured to perform second cyclic shifting on the data sequences of the L continuous symbols respectively; and an acquisition module 74, configured to acquire original data of the modulated data according to the data sequences having been subjected to the second cyclic shifting.

In an optional embodiment, the cyclic shifting module 72 is further configured to determine a difference value between cyclic shifts of adjacent symbols in the L continuous symbols according to a value of T1, T1 being a symbol interval of the L continuous modulated symbols.

Figure 8:
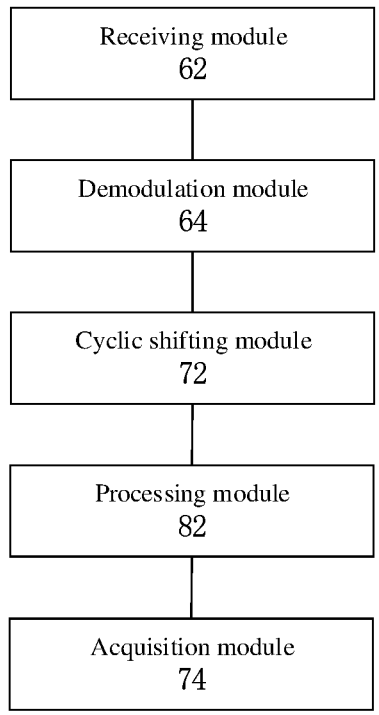
FIG. 8 is a second structure block diagram of a data demodulation device for a multicarrier system according to an optional embodiment of the disclosure.

In an optional embodiment, FIG. 8 is a second structure block diagram of a data demodulation device for a multicarrier system according to an optional embodiment of the disclosure. As shown in FIG. 8, the device includes all the modules shown in FIG. 7 and the device further includes a processing module 82, connected with the cyclic shifting module 72 and the acquisition module 74 and configured to perform FFT and channel equalization and detection on the data.

It is apparent that those skilled in the art should know that each module or each operation of the disclosure may be implemented by a universal computing device, and the modules or operations may be concentrated on a single computing device or distributed on a network formed by a plurality of computing devices, and may optionally be implemented by program codes executable for the computing devices, so that the modules or operations may be stored in a storage device for execution with the computing devices, the shown or described operations may be executed in sequences different from those described here in some circumstances, or may form each integrated circuit module respectively, or multiple modules or operations therein may form a single integrated circuit module for implementation. As a consequence, the disclosure is not limited to any specific combination of hardware and software.

Embodiment 5

The embodiment also provides a multicarrier system, which is configured to implement the abovementioned embodiments and preferred implementation modes. What has been described will not be elaborated. Although the device described in the following embodiment is preferably implemented with software, implementation with hardware or a combination of the software and the hardware is also possible and conceivable.

The multicarrier system includes a sending node 12 and a receiving node 14. The sending node 12 is configured to perform cyclic shifting on data sequences of L continuous symbols respectively, L≥2, and modulate the cyclically shifted data sequences by use of a specified waveform function, an independent variable range of the waveform function being greater than or equal to a symbol interval of the L modulated symbols. The receiving node 14 is configured to receive modulated data, the modulated data being data obtained by performing first cyclic shifting on the data sequences of the L continuous symbols respectively and modulating the data sequences having been subjected to the first cyclic shifting by use of the specified waveform function, perform demodulation on the data by use of the specified waveform function to obtain the data sequences of the L continuous symbols, perform second cyclic shifting on the data sequences of the L continuous symbols respectively and acquire original data of the modulated data according to the data sequences having been subjected to the second cyclic shifting.

Embodiment 6

The embodiment of the disclosure also provides a storage medium. Optionally, in the embodiment, the storage medium may be configured to store a program code for executing the following operations: in S1, cyclic shifting is performed on data sequences of L continuous symbols respectively, L≥2; in S2, the cyclically shifted data sequences are modulated by use of a waveform function, an independent variable range of the waveform function being greater than or equal to a symbol interval of the L modulated symbols.

Optionally, the storage medium is further configured to store a program code for executing the following operation: a difference value between cyclic shifts of adjacent symbols in the L continuous symbols is determined according to a value of T1.

Optionally, the storage medium is further configured to store a program code for executing the following operation: the cyclic shifts of the adjacent symbols meet one of the following formulae:

$\mod((\mod(Y(i+1), T0) - \mod(Y(i), T0) + T0), T0) = \mod(T1, T0)$ and $T0 - \mod((\mod(Y(i+1), T0) - \mod(Y(i), T0) + T0), T0) = \mod(T1, T0)$, where Y(1), Y(2) ... Y(L) are cyclic shifts and are real numbers, i is an integer between [1, L−1] and T0 is a reciprocal of an interval between adjacent subcarriers of the frequency-domain data before execution of IFFT.

Optionally, the storage medium is further configured to store a program code for executing the following operations: in S1, independent variable shifting is performed on the waveform function corresponding to the L continuous symbols; in S2, a grouped linear operation is performed on the waveform function having been subjected to the independent variable shifting and on the cyclically shifted data sequences of the L continuous symbols.

Optionally, the storage medium is further configured to store a program code for executing the following operation: independent variable shifting is performed on the waveform function corresponding to the L continuous symbols in the following manner: g(t−D(i)), where g(t) is the waveform function, D(i) is an independent variable shift of the waveform function corresponding to an ith symbol, D(i+1)−D(i) =T1 and i is an integer between [1, L].

Optionally, the storage medium is further configured to store a program code for executing the following operations. In S1, first M-fold sampling and grouping is performed on the cyclically shifted discrete data sequences of the L continuous symbols to obtain M sets of data sequences S(m), m=1, 2, ... , M, and a length of each set of data sequence being L. In S2, second M-fold sampling and grouping is performed on a discrete function form of g(t−D(i)) corresponding to the ith symbol to obtain M sets of data sequences Yi(m), m=1, 2, ... , M, a length of each set of data sequence being G and G being greater than or equal to N. In S3, a linear operation is performed on S(m) and L Yi(m) to generate data sequences R(m), namely $$R(m) = S(m) \times \begin{bmatrix} Y1(m) \\ Y2(m) \\ \vdots \\ YL(m) \end{bmatrix},$$

m=1, 2, ... , M. The M sets of data sequences R(m) are arranged according to a predetermined rule to obtain the modulated data sequences of the L continuous symbols, M being the number of the time-domain data sequences within time T0 and T0 being the reciprocal of the interval between the adjacent subcarriers of the frequency-domain data before execution of IFFT.

Optionally, the storage medium is further configured to store a program code for executing the following operation: sampling is performed on a continuous function form of the waveform function to obtain the discrete function form of g(t−D(i)) corresponding to the ith symbol, a sampling interval being a time interval between adjacent discrete data in the time-domain data sequences of the L continuous symbols.

An embodiment of the disclosure also provides another storage medium. Optionally, in the embodiment, the storage medium may be configured to store a program code for executing the following operations. In S1, modulated data is received, the modulated data being data obtained by performing first cyclic shifting on data sequences of L continuous symbols respectively and modulating the data sequences having been subjected to the first cyclic shifting by use of a specified waveform function. In S2, demodulation is performed on the data by use of the specified waveform function to obtain the data sequences of the L continuous symbols.

Optionally, the storage medium is further configured to store a program code for executing the following operations. In S1, second cyclic shifting is performed on the data sequences of the L continuous symbols respectively. In S2, original data of the modulated data is acquired according to the data sequences having been subjected to the second cyclic shifting.

Optionally, the storage medium is further configured to store a program code for executing the following operation: FFT and channel equalization and detection are performed on the data.

Optionally, in the embodiment, the storage medium may include, but not limited to various media capable of storing a program code, such as a U disk, a Read-Only Memory (ROM), a Random Access Memory (RAM), a mobile hard disk, a magnetic disk or an optical disk.

Optionally, specific examples in the embodiment may refer to the examples described in the abovementioned embodiments and optional implementation modes and will not be elaborated in the embodiment.

Obviously, those skilled in the art should know that each module or each operation of the disclosure may be implemented by a universal computing device, and the modules or operations may be concentrated on a single computing device or distributed on a network formed by a plurality of computing devices, and may optionally be implemented by program codes executable for the computing devices, so that the modules or operations may be stored in a storage device for execution with the computing devices, and furthermore, the illustrated or described operations may be executed in sequences different from those described here in some circumstances, or may form each integrated circuit module respectively, or multiple modules or operations therein may form a single integrated circuit module for implementation. As a consequence, the disclosure is not limited to any specific combination of hardware and software.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

Through the embodiments of the disclosure, cyclic shifting is performed on the data sequences of the L continuous symbols respectively, L≥2; and the cyclically shifted data sequences are modulated by use of a waveform function, the independent variable range of the waveform function being greater than or equal to the symbol interval of the L modulated symbols. Therefore, the technical problems of incapability of effectively suppressing out-of-band leakage or flexibly adjusting a symbol interval to adapt to different channel environments under the condition that the related art is incompatible with an LTE system and has poor demodulation performance are solved, thus achieving the effects of suppressing the out-of-band leakage relatively well, decreasing widths of main lobes of subcarriers on a frequency domain, further avoiding overlapping of the main lobes of adjacent subcarriers, canceling interference between the adjacent subcarriers, achieving relatively high compatibility with the LTE system and, meanwhile, improving demodulation performance and symbol interval regulation flexibility by simple cyclic shifting operations.

The invention claimed is:

1. A data modulation method for a multicarrier system, comprising:
    performing cyclic shifting on data sequences of L continuous symbols respectively, L≥4, wherein values of cyclic shifts of the L continuous symbols are different; and
    modulating the cyclically shifted data sequences by use of a waveform function, wherein an independent variable range of the waveform function is N×T1, T1 is a symbol interval of the L continuous symbols having been subjected to the modulation, N is a real number greater than or equal to 1, T1>T0, and T0 is a reciprocal of an interval between adjacent subcarriers in the multicarrier system.

2. The method of claim 1, further comprising: determining a difference value between different cyclic shifts of adjacent symbols in the L continuous symbols according to a value of T1.

3. The method of claim 2, wherein the cyclic shifts of the adjacent symbols meet one of following formulae:
    mod((mod(Y(i+1), T0)−mod(Y(i), T0)+T0), T0)=mod(T1, T0); and
    T0−mod((mod(Y(i+1), T0)−mod(Y(i), T0)+T0), T0)=mod(T1, T0), where Y(1), Y(2) . . . Y(L) are the cyclic shifts and are real numbers, i is an integer between [1, L−1].

4. The method of claim 1, wherein the modulation comprises Filter Bank (FB) modulation.

5. The method of claim 1, wherein the waveform function comprises one of: a root raised cosine function, a raised cosine function, a piecewise function and a rectangular function.

6. The method of claim 1, wherein modulating the cyclically shifted data sequences of the L continuous symbols by use of the waveform function comprises:
    performing independent variable shifting on the waveform function corresponding to the L continuous symbols respectively; and
    performing a grouped linear operation on the waveform function having been subjected to the independent variable shifting and the cyclically shifted data sequences of the L continuous symbols.

7. The method of claim 6, wherein the independent variable shifting is performed on the waveform function corresponding to the L continuous symbols in a following manner: g(t−D(i)), where g(t) is the waveform function, D(i) is an independent variable shift of the waveform function corresponding to an ith symbol, D(i+1)−D(i)=T1 and i is an integer between [1, L].

8. The method of claim 7, wherein performing the grouped linear operation on the waveform function having been subjected to the independent variable shifting and the cyclically shifted data sequences of the L continuous symbols comprises:

performing first M-fold sampling and grouping on cyclically shifted discrete data sequences of the L continuous symbols having been subjected to the cyclical shifting to obtain M sets of data sequences S(m), m=1, 2, . . . , M and a length of each set of data sequence being L;

performing second M-fold sampling and grouping on a discrete function form of g(t−D(i)) corresponding to the ith symbol to obtain M sets of data sequences Yi(m), m=1, 2, . . . , M, a length of each set of data sequence being G and G being greater than or equal to N;

performing a linear operation on S(m) and L Yi(m) to generate data sequences R(m), that is $$R(m) = S(m) \times \begin{bmatrix} Y1(m) \\ Y2(m) \\ \vdots \\ YL(m) \end{bmatrix},$$

m=1, 2, . . . , M; and arranging the M sets of data sequences R(m) according to a predetermined rule to obtain the modulated data sequences of the L continuous symbols, M being the number of the time-domain data sequences within time T0 and T0 being the reciprocal of an interval between adjacent subcarriers in the multicarrier system.

9. A data demodulation method for a multicarrier system, comprising:

receiving modulated data, the modulated data being data obtained by performing first cyclic shifting on data sequences of L continuous symbols respectively and modulating the data sequences having been subjected to the first cyclic shifting by use of a waveform function, wherein values of cyclic shifts of the L continuous symbols are different, L≥4, an independent variable range of the waveform function is N×T1, T1 is a symbol interval of the L continuous symbols having been subjected to the modulation, N is a real number greater than or equal to 1, T1>T0, and T0 is a reciprocal of an interval between adjacent subcarriers in the multicarrier system; and performing demodulation on the data by use of the waveform function to obtain the data sequences of the L continuous symbols.

10. The method of claim 9, further comprising:

performing second cyclic shifting respectively on the data sequences of the L continuous symbols having been subjected to the first cyclic shifting; and acquiring original data of the modulated data according to the data sequences having been subjected to the second cyclic shifting.

11. The method of claim 10, further comprising: determining a difference value between cyclic shifts of adjacent symbols in the L continuous symbols according to a value of T1, T1 being a symbol interval of the L continuous symbols having been subjected to the modulation.

12. The method of claim 10, wherein a cyclic shift of the second cyclic shifting and a cyclic shift of the first cyclic shifting are opposite in direction and the same in modulus value.

13. A data modulation device for a multicarrier system, comprising: a processor and a memory configured to store a computer program runnable on the processor, wherein the processor is configured to perform cyclic shifting on data sequences of L continuous symbols respectively, L≥4, wherein values of cyclic shifts of the L continuous symbols are different; and to modulate the cyclically shifted data sequences by use of a waveform function, wherein an independent variable range of the waveform function is N×T1, T1 is a symbol interval of the L symbols having been subjected to the modulation, and N is a real number greater than or equal to 1, T1>T0, and T0 is a reciprocal of an interval between adjacent subcarriers in the multicarrier system.

14. The device of claim 13, wherein the processor is further configured to determine a difference value between different cyclic shifts of adjacent symbols in the L continuous symbols according to a value of T1.

15. The device of claim 14, wherein the cyclic shifts of the adjacent symbols meet one of following formulae:

mod((mod(Y(i+1), T0)−mod(Y(i), T0)+T0), T0)=mod(T1, T0) and T0−mod((mod(Y(i+1), T0)−mod(Y(i), T0)+T0), T0)=mod(T1, T0), where Y(1), Y(2) . . . Y(L) are the cyclic shifts and are real numbers, i is an integer between [1, L−1].

16. The device of claim 13, wherein the processor is further configured to perform independent variable shifting on the waveform function corresponding to the L continuous symbols and perform a grouped linear operation on the waveform function having been subjected to the independent variable shifting and the cyclically shifted data sequences of the L continuous symbols.

17. The device of claim 16, wherein the processor is further configured to perform the independent variable shifting on the waveform function corresponding to the L continuous symbols in a following manner: g(t−D(i)), where g(t) is the waveform function, D(i) is an independent variable shift of the waveform function corresponding to an ith symbol, D(i+1)−D(i)=T1 and i is an integer between [1, L].

18. A data demodulation device for a multicarrier system, comprising:

a processor and a memory configured to store a computer program runnable on the processor, wherein the processor is configured to receive modulated data, the modulated data being data obtained by performing first cyclic shifting on data sequences of L continuous symbols respectively and modulating the data sequences having been subjected to the first cyclic shifting by use of a waveform function, wherein values of cyclic shifts of the L continuous symbols are different, L≥4, an independent variable range of the waveform function is N×T1, T1 is a symbol interval of the L continuous symbols having been subjected to the modulation, N is a real number greater than or equal to 1, T1>T0, and T0 is a reciprocal of an interval between adjacent subcarriers in the multicarrier system; and to perform demodulation on the data by use of the waveform function to obtain the data sequences of the L continuous symbols.

19. The device of claim 18, wherein the processor is further configured to perform second cyclic shifting respectively on the data sequences of the L continuous symbols having been subjected to the first cyclic shifting; and to acquire original data of the modulated data according to the data sequences having been subjected to the second cyclic shifting.

20. The device of claim 19, wherein the processor is further configured to determine a difference value between cyclic shifts of adjacent symbols in the L continuous symbols according to a value of T1, T1 being a symbol interval of the L continuous symbols having been subjected to the modulation.

21. A non-transitory computer-readable storage medium, comprising a stored program which is, when run, to execute the method of claim 1.

22. A non-transitory computer-readable storage medium, comprising a stored program which is, when run, to execute the method of claim 9.

* * * * *